United States Patent
Brüssel

(10) Patent No.: US 6,776,596 B2
(45) Date of Patent: Aug. 17, 2004

(54) APPARATUS FOR THE MANUFACTURE OF FIBER-REINFORCED PLASTIC COMPOSITIONS

(75) Inventor: Richard Brüssel, Sulzfeld (DE)

(73) Assignee: Maschinenfabrik J. Dieffenbacher GmbH & Co., Eppingen (DE)

( * ) Notice: Subject to any disclaimer, the term of this patent is extended or adjusted under 35 U.S.C. 154(b) by 150 days.

(21) Appl. No.: 09/997,253

(22) Filed: Nov. 30, 2001

(65) Prior Publication Data

US 2002/0089082 A1 Jul. 11, 2002

(30) Foreign Application Priority Data

Nov. 30, 2000 (DE) .......................................... 100 59 525

(51) Int. Cl.⁷ ............................ B05C 3/12; B29C 47/10; B29C 47/40
(52) U.S. Cl. ........................ 425/113; 425/204; 425/208; 425/378.1; 425/308; 118/125; 118/424; 118/427; 366/76.1; 366/76.5; 366/81
(58) Field of Search ................................. 425/113, 114, 425/204, 200, 208, 378.1, 381.2, 382.3, 308; 118/424, 427, 125; 366/81, 76.1, 76.5

(56) References Cited

U.S. PATENT DOCUMENTS

| 4,875,847 A | * 10/1989 | Wenger et al. ............... 425/204 |
| 6,106,266 A | * 8/2000 | Ruger ......................... 425/204 |
| 6,238,733 B1 | 5/2001 | Therolf ....................... 427/209 |

FOREIGN PATENT DOCUMENTS

| DE | 198 36 787 A1 | 2/2000 |
| DE | 199 59 525 A1 | 6/2001 |

* cited by examiner

Primary Examiner—Robert Davis
Assistant Examiner—Joseph S Del Sole
(74) Attorney, Agent, or Firm—Foley & Lardner LLP

(57) ABSTRACT

The invention is addressed to the problem of providing a method whereby a mixing of bulk material containing fibers (fiber material) and plastic granules for the plasticate extrusion of long fiber reinforced thermoplastics (LFT) will be possible during the melting process with high production outputs and with minimized material content in the extruder system and minimized fiber damage, and to the problem of creating an apparatus with an extruder for the practice of the method, which will have an extruder housing of modified geometry as to the feed opening and the corresponding screw elements, so that the disadvantages described above are avoided.

12 Claims, 5 Drawing Sheets

APPARATUS FOR THE MANUFACTURE OF FIBER-REINFORCED PLASTIC COMPOSITIONS

BACKGROUND OF THE INVENTION

1. Field of the Invention

The invention relates to a method for the manufacture of fiber-reinforced plastic compositions. It furthermore relates to an apparatus for the practice of the method.

2. Related Art

A method of this kind is disclosed in U.S. Pat. No. 6,238,733 (which claims priority from DE 198 36 787 A1), which is incorporated herein by reference in its entirety. The method and the plasticizing extruder described therein have worked well in practice. But for special applications, especially bulk material containing fibers, there is still room for improvement.

It is furthermore known that so-called rodlet granules, which at present are usually glass fiber reinforced plastic rodlets, are used for plasticate extrusion. The rodlet granules are generally 25 mm long and are melted in slow rotating single-screw extruders. Relatively large extruders are necessary for practical melting performance, because these fiber/plastic rodlets have to be fused with as little shear energy as possible, but insofar as possible by thermal conduction. This gentle melting is necessary in order to obtain the largest possible percentage of the initial fiber length. These rodlet granules are semi-manufactured products in which the fiber content is determined by the component to be manufactured. Since this semi-manufactured product is relatively expensive to produce, a method has been adopted in which so-called concentrate rodlets with the greatest possible fiber content are used. These concentrate rodlets are then mixed in the melting extruder with lower-cost plastic granules to the fiber content required in the component. This method has favorably influenced the material costs, but the extruders are not made smaller nor is the melting performance improved.

Since the melting performances required in practice involve ever larger extruders with greater material capacities, fiber damage also increases and performance decreases in brief cycling times with regard to plasticate weight tolerance and start-up.

It is furthermore known that, for the drawing of non-sticky materials of low bulk weight into the extruder, relatively great screw pitches and grooved barrels are commonly used in order to increase the thrust of material in the open feed area.

If bulk material, such as chopped fibers, for example, is to be combined with plastic melted in a separate extruder, then of course the melted plastic is fed to the bulk material downstream in the closed area by the extruder into which the fibers are fed. This has the disadvantage, however, that the fibers and the melted plastic do not mix uniformly when they meet, but form zones of fiber concentration and plastic concentration. These must then be blended downstream by mixing means in order to achieve uniform mixing and impregnation of the fibers. This signifies that a correspondingly long stay in the extruder with the mixing means is necessary, which of course signifies fiber damage and calls for large amounts of material.

In the attempt to feed melted plastic and bulk material simultaneously into the feed opening of an extruder and at the same time mix them, adhesion and therefore bridging very quickly take place, which interferes with or blocks the proportional feed.

SUMMARY OF THE INVENTION

The invention is addressed to the problem of providing a method whereby a mixing of bulk material containing fibers (fiber material) and plastic granules for the plasticate extrusion of long fiber reinforced thermoplastics (LFT) will be possible during the melting process with high production outputs and with minimized material content in the extruder system and minimized fiber damage, and to the problem of creating an apparatus with an extruder for the practice of the method, which will have an extruder housing of modified geometry as to the feed opening and the corresponding screw elements, so that the disadvantages described above are avoided.

The solution of this problem as to the method consists in melting the plastic granules at a preferably higher temperature than the necessary plasticate temperature, the molten plastic and the fiber material are combined together in the feed opening of a second extruder, the plasticizing extruder, and the fiber material is largely uniformly embedded in the molten plastic within the feed and impregnation section of the plasticizing extruder and is brought completely to the plasticate temperature in the discharge and conveyor section, the fiber material being preheated before it is combined, preferably to such an extent that it can be delivered without problems into the feed opening without any adhesion, and that the fiber material together with the molten plastic is drawn into a cylindrical bore in the feed screw from a ¼ to a ¾ wrap-around from the point of contact with the fiber material, with a diameter D enlarged by 2 to 20 mm, and preferably arranged off-center.

The solution as to the apparatus is that a simultaneously rotating dual screw extruder with preferably mop-up screw elements of great pitch is provided, which has a slot-like feed opening over a feed screw, while beginning from the feed opening and in the range of the feed screw the cylindrical bore of the feed screw is increased beginning from the infeed opening and at the feed screw the cylindrical bore increases over an arc u of ¼ to ¾ of the circumference by 2 to 20 mm, and at the end a stripping bar is disposed, and then the housing bore of the feed screw is reduced to the screw diameter d.

It is especially advantageous that a parallel double-screw extruder is used, in which a slot-shaped, relatively long feed opening is above the one screw. This screw is referred to hereinafter as the feed screw. In the area of the feed screw the diameter of the screw housing is increased so that the molten plastic ribbon lying on the screw land is spaced away from the screw housing. To prevent any material build-up on the screw land beyond the enlarged diameter of the housing, the screw bore in the housing is reduced to the screw diameter before the molten plastic ribbon comes onto it. This is achieved preferably by an inserted stripper bar. To assure that the mixing of bulk material and molten plastic ribbon or film will be as uniform as possible, the bulk material is laid out flat with no heaping approximately over the width of the plastic ribbon. In the feed area, mop-up screws of relatively great pitch are preferably used.

For the infeed of bulk material, as for example concentrate rodlets, staple fibers, sprinkle fibers, granules or other such material, the reach of the second screw in the housing bore is preferably not increased.

It is also advantageous to work with concentrate rodlets and the plastic required for the fiber concentration in the component is fused before it is combined with the concentrate rodlets or the fiber material. That is to say, the fusion heat for the admixed plastic is applied while the long fibers are not present. Therefore it is possible to use high rotary speeds and great dissipation in this range. It is also advantageous if the plastic is melted at a higher temperature than the temperature required in the plasticate and the fiber material is preheated up to the temperature at which it still does not tend to become tacky and can still be fed in without problems. Thus the heat is present in the material according to the fiber concentration in the bulk material and in the component fiber content, so that all that is needed in order to achieve fusion and equalization of temperature is the conduction of heat to the concentrate rodlets embedded in the fluid plastic.

This takes place over a relatively short distance in the extruder with a low material content. The parallel-running dual screw extruder has in this case proven advantageous. The diameter increase in the feed area is narrowed more or less far downstream into the closed area, according to the fiber structure and impregnation ratio. At the same time the enlargement of the cylinder diameter terminates preferably spirally in the sense of rotation of the screw, so that the screw edges will not cut the fibers or rodlets in the transition to the reduced diameter. Another possibility for improving the entry of bulk goods is to configure the feed end with a powered roll with scraper or an oscillating wall. The roll in that case is driven with circumferential velocities equal to or greater than the feed screw, and thus it draws the bulk material inwardly.

To further improve the feeding action, the extruder housing is additionally provided with a tapered feed area in addition to the diameter increase.

In one embodiment of the invention, there is a method for the production of fiber-reinforced plastic compositions using a plasticizing extruder in which cold or preheated concentrate rodlets, recyclate chips, bulk fibers or other granular materials and fiber material are drawn through a guiding gate and a preheating device into an infeed opening of the plasticizing extruder, wherein the infeed opening is preferably parallel to at least one of extruder axes and the fiber material is approximately tangental to an extruder screw and wound drivingly around the extruder screws and drawn into cylinder bores of screw cylinders while the application of a fluid plastic film to extruder screw lands takes place along with the drawing-in/pressing-in of the fiber material into the fluid plastic film, then the fiber material is wetted or imbibed on all sides with the liquid plastic within a feed and impregnation section with the individual fibers on the extruder screws and carried into a output and transport section and discharged as a fiber-reinforced plastic composition susceptible of further processing, characterized in that, in a first extruder, the plastic granules are melted in an entrance opening of a plasticizing extruder, the melted plastic and the fiber material is combined, and within the feed and impregnating section of the plasticizing extruder, the fiber material is largely uniformly embedded in the melted plastic and brought completely to the plasticate temperature in the discharge and transport section, and that fiber material with plastic fused onto it is fed into a cylinder bore of the feed screw with a wrap-around of ¼ to ¾ from the point of contact with the fiber material, the bore having a disposed diameter enlarged by 2 to 20 mm.

In one aspect of the present invention, plastic granules are melted to a higher temperature than the necessary plasticate temperature.

In another aspect of the present invention, fiber material is preheated before combination to such an extent that it can still be fed without problems, and without sticking, into the infeed opening.

In another aspect of the present invention, the bore having a disposed diameter enlarged by 2 to 20 mm is eccentric.

In another aspect of the present invention, fiber material is proportioned gravimetrically into the infeed opening.

In another aspect of the present invention, fiber material is in ribbon form and laid flat and is fed and proportioned uniformly to the melted plastic film in a slot-like feed opening of the plasticizing extruder.

In another embodiment of the present invention, there is an apparatus for the production of fiber-reinforced plastic compositions from fiber material and melted plastic with a plasticizing extruder and a plastic melting extruder heating apparatus heating the fiber material in a transport line to the plasticizing extruder, an impregnating apparatus in the plasticizing extruder for the introduction of the fiber material and for mixing, the plasticizing extruder comprising a housing with two bores and axes of two extruder screws driven in rotation, a feed opening for the introduction of the fiber material into the bores, the feed opening being provided in the housing, for the production of fiber-reinforced plastic compositions characterized in that the plasticizing extruder comprises a parallel double screw extruder with preferably mop-up screw elements of great pitch, a slot-like feed opening above a feed screw, a cylinder bore beginning at the feed opening and in the range of a feed screw, the cylinder bore being made with a diameter having a ¼ to ¾ wrap-around enlarged by 2 to 20 mm, a stripper bar disposed at an end, and a housing bore of the feed screw beyond the stripper bar, wherein the housing bore is reduced to the screw diameter.

In another aspect of the present invention, the diameter having a ¼ to ¾ wrap-around enlarged by 2 to 20 mm is eccentric.

In another aspect of the present invention, a feed area is expanded conically onto the feed screw.

In another aspect of the present invention, a diameter enlargement in a feed area is created downstream into a closed area of a dual screw extruder, wherein the position of the diameter enlargement in a feed area is positioned to accommodate fiber structure and impregnation characteristic.

In another aspect of the present invention, a driven feed roll with a stripper bar is disposed in a feed area of the feed opening.

In another aspect of the present invention, an entry jaw which can move in and out is disposed in relation to the feed opening.

In another aspect of the present invention, following the entry jaw, the enlarged housing diameter terminates spirally in the direction of rotation of the feed screw.

In another aspect of the present invention, the entry jaw is thermally insulated from the housing.

In another aspect of the present invention, the entry jaw can be moved by an oscillating drive.

In another aspect of the present invention, the temperature of the entry jaw can be tempered below the tackiness temperature of the fiber material.

In another aspect of the present invention, exchangeable scrapers are provided in the feed opening.

DETAILED DESCRIPTION OF THE PREFERRED EMBODIMENTS

Figure 1:
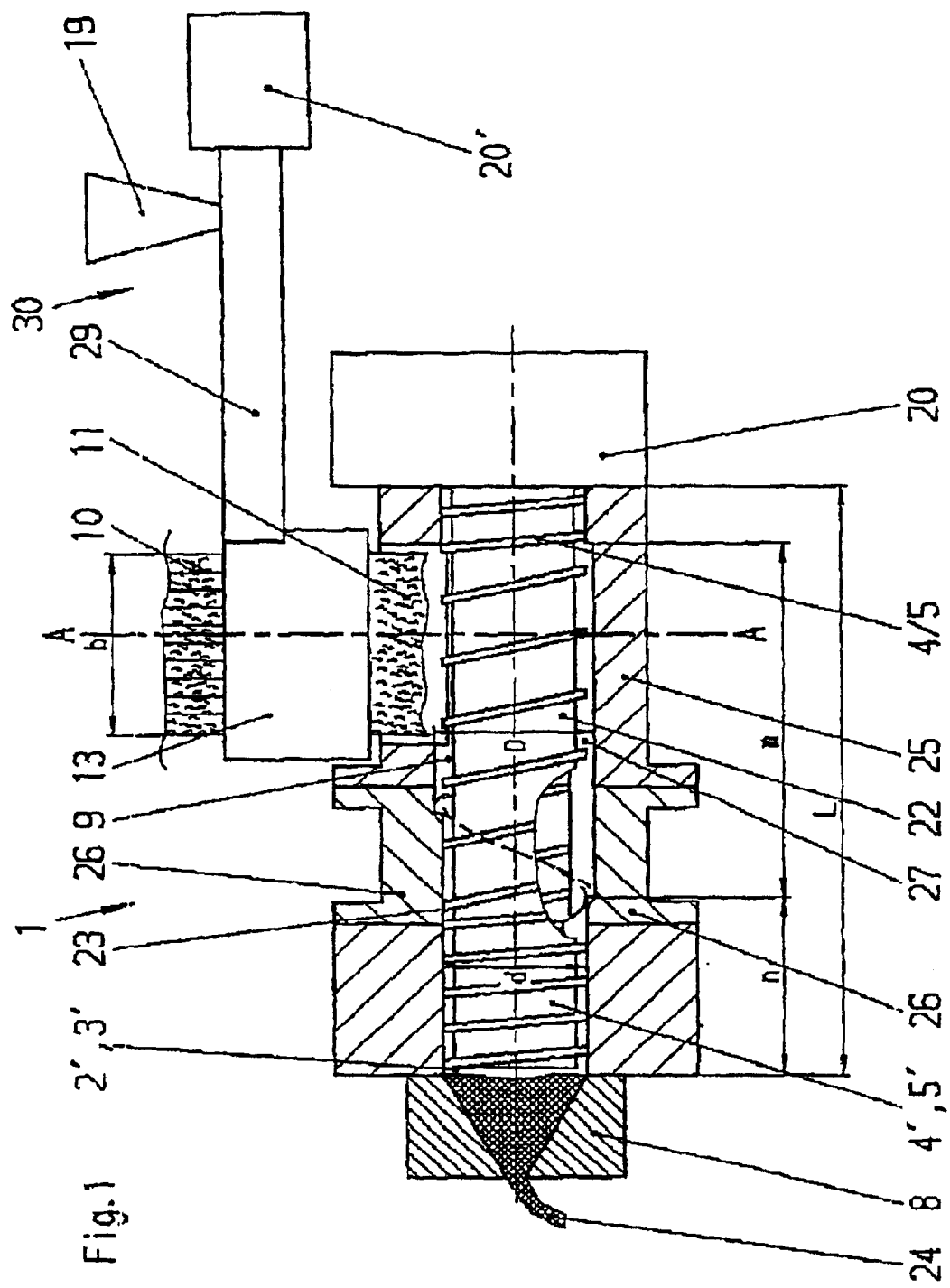
FIG. 1 shows the apparatus for the practice of the method of the invention, in a side view and in section B—B in FIG. 2.
Figure 2:
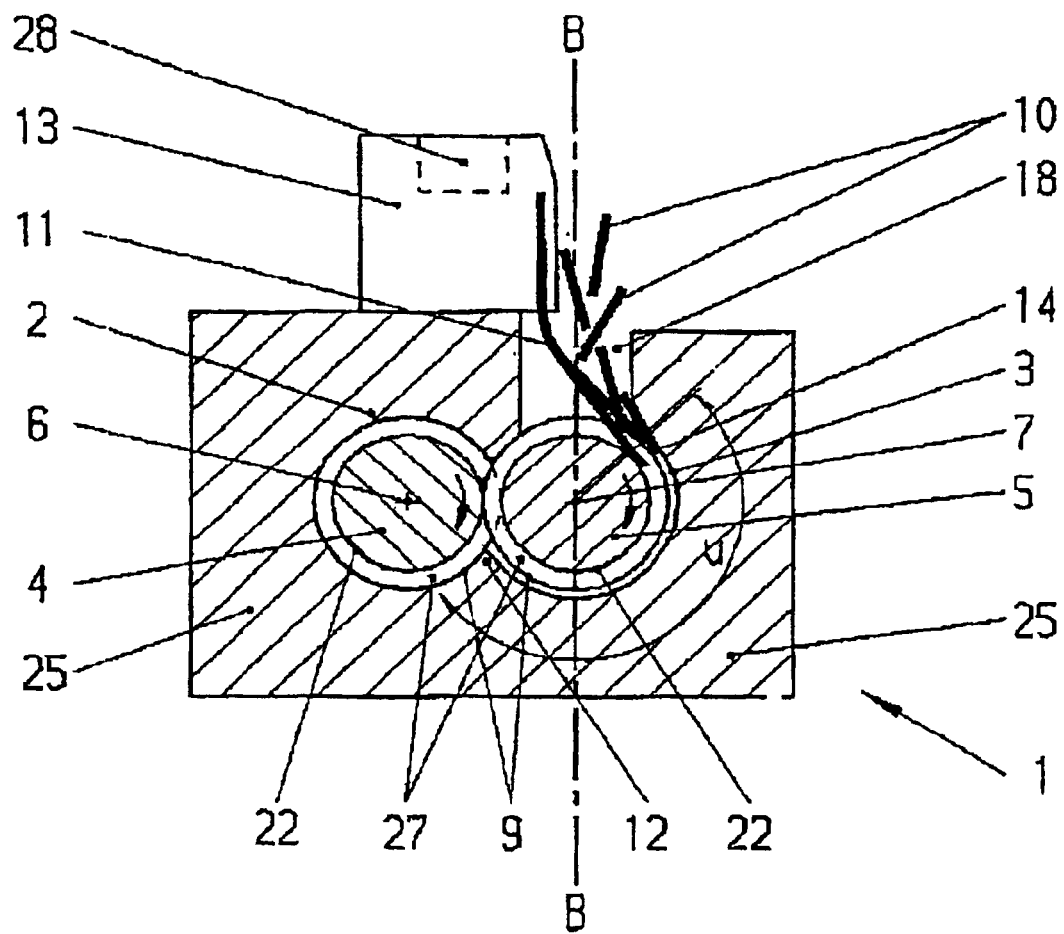
FIG. 2 shows the plasticizing extruder according to the invention in a section A—A in FIG. 1.
Figure 3:
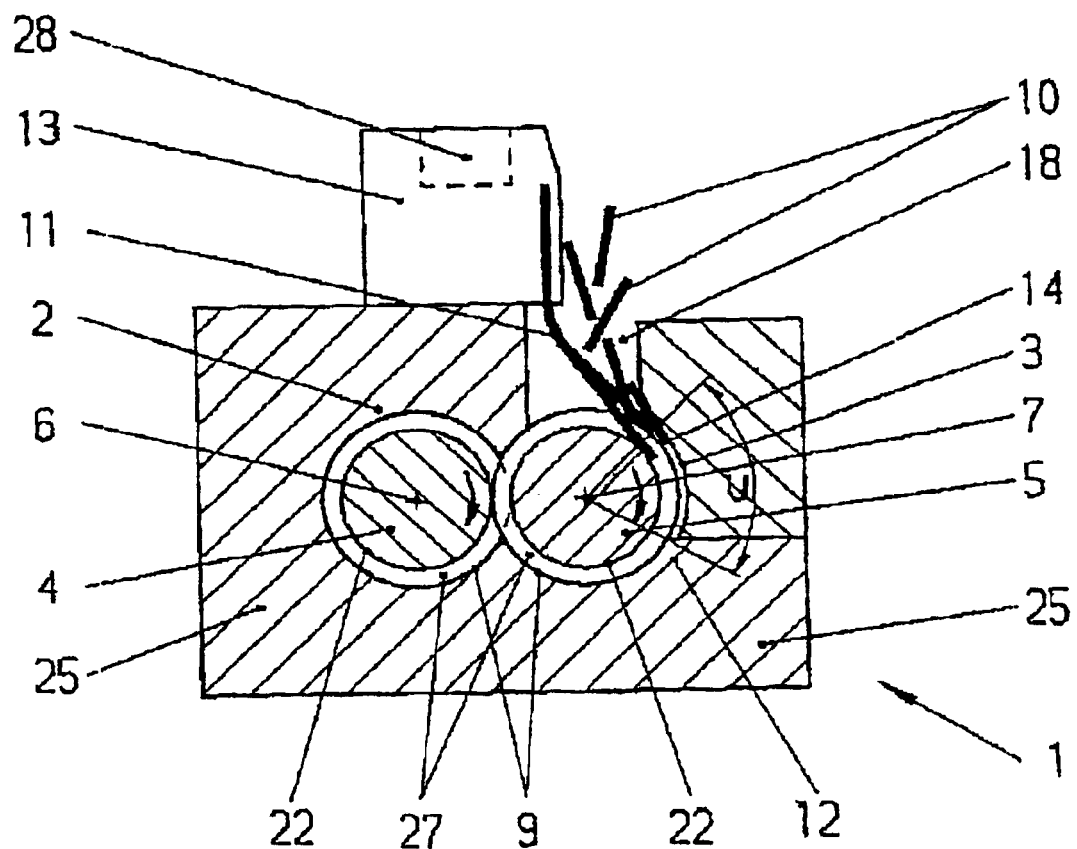
FIG. 3 shows the plasticizing extruder according to FIG. 2 with a smaller arc u.

FIG. 1 shows the apparatus for the practice of the method, comprising the plasticizing extruder 1 and the plastic-melting extruder 30. In FIGS. 1 to 5, the plasticizing extruder 1 according to the invention can be seen as a dual screw extruder with a length L. As FIG. 1 shows, the length of the plasticizing extruder 1 is divided into two working areas and configured accordingly, namely into a feed and impregnating section m and an output and transport section n. For the shaping discharge of the product 24 (a fiber-reinforced plastic composition) a discharge nozzle 8 is provided at the end. FIG. 2 shows section A—A of FIG. 1 the fiber material 10 in bulk form being drawn into the infeed opening 18. The plasticizing extruder 1 includes furthermore the housing 25 with the housing bores 2 and 3 as well as the extruder axes 6 and 7 for the feed screw 5 and the tandem screw 4 in the feed and impregnation section m, the housing 26 with the bores 2' and 3' for the extruder screws 4' and 5' of the discharge and transport section n. In FIG. 1 there is shown the plastic melting extruder 30 for the preparation of the plastic from the hopper 19 for the feeding and transfer mechanism 29, and drive 20'. The plastic transfer mechanism 29 passes the prepared plastic film 11 through the plastic introducing funnel 28 and into the discharge nozzle 13. The drive 20 serves to drive the extruder screws 4/5 and 4'/5'. In the manufacturing operation the fiber material 10 is driven by the feed movement into the feed passage 27 and from there toward the product discharge by the screw units of the plasticizing extruder 1 through the screw land 9 and the screw root 22. The fiber material 10 with the molten plastic is driven by the screw extruder 1, with its two screws rotating in the same sense, from the feed screw 5 to the tandem screw 4 and vice versa in the discharge direction. That means that the fiber material 10 is driven in a kind of wrap-around, depending on the infeed width b, with more or less of an overlap, in the direction of the discharge nozzle 8. During this sliding movement the molten plastic film 11 carried with the fiber material is worked into the fiber material and the individual fibers.

Figure 4:
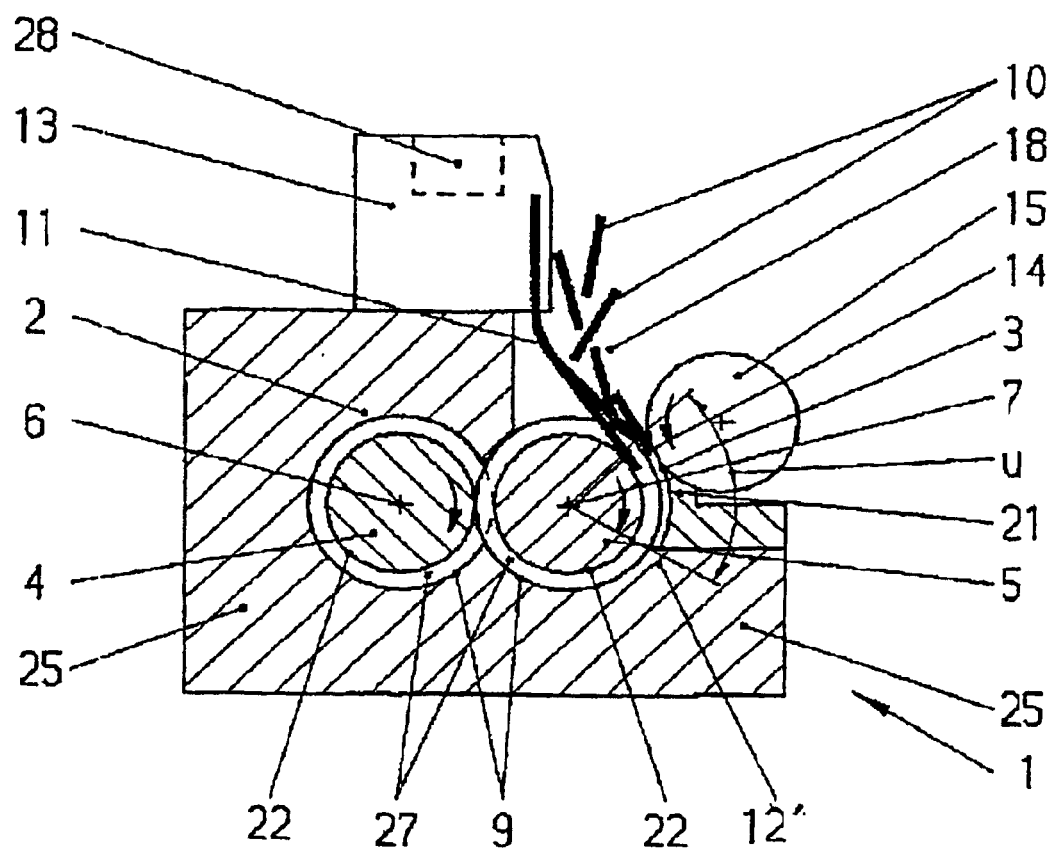
FIG. 4 shows the plasticizing extruder of FIG. 2 with feed screw in the infeed opening.
Figure 5:
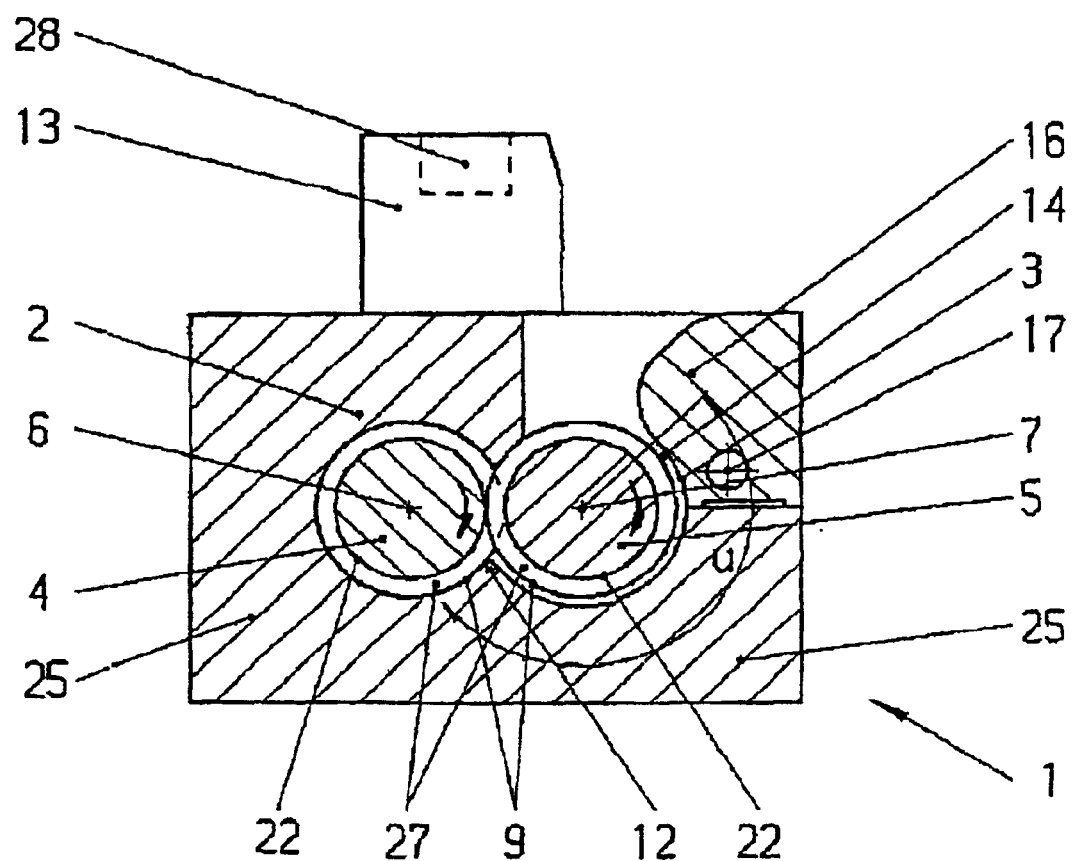
FIG. 5 shows the plasticizing extruder of FIG. 2 with an infeed jaw.

As it further can be seen from FIGS. 1 to 5, the fiber material 10 is drawn into the feed slot of the feed opening 18 of the plasticizing extruder 1 with its width b parallel to the extruder axes 6 and 7 and approximately tangentially onto the feed screw 5, with a ¼ to ¾ wrap-around corresponding to wrap-around angle u around the housing bore 3, which in some cases is eccentric, and has the diameter D plus 2 to 20 millimeters. The application of the fluid plastic film 11 directly onto the inwardly falling fiber material 10 takes place in the feed opening 18 where the fiber material is pressed into the fluid plastic film 11 applied to the feed screw 5 from the dispensing nozzle 13. Within the feed and impregnation section m all sides of the fiber material 10 thus become wetted or impregnated by kneading on the extruder screws 4 and 5 with the fluid plastic film 11. Then the individual fibers of the fiber material 10, thoroughly impregnated or imbibed are carried from the feed and impregnation section m into the discharge and outfeed section n, the complete fusion coating and fiber distribution taking place in the case of rodlet granules. Depending on the thickness of the fiber material and the matching consistency of the molten plastic it may be desirable for the fiber material 10 to be forced into the grooves and onto the lands 23 of the feed screw 5 by means of a stripping edge 12 or stripper bar 21. In a preferred embodiment, the feeding of the fiber material 10 is achieved by a feed roll 15 disposed in the feed opening 18, as shown in FIG. 4, although this is not necessary to practice the present invention.

In another preferred embodiment, the drawing of the fiber material 10 into the feed opening 18 is likewise improved by conically flaring the feed area. In yet a further improved embodiment, trouble-free guidance of the fiber material 10 in the feed opening 18 is achieved, according to FIG. 5, in providing a removable feed jaw 16. This aspect also provides for a simplified cleaning process. This feed jaw 16 can be optionally thermally insulated from the housing 25 and, being heated or cooled by means of a bore 17, is adjustable to a temperature that is slightly below the tackiness temperature of the fiber material. It is furthermore envisioned that equipping the feed jaw 16 with an oscillatory drive will yield advantageous results. Additionally, it is envisioned that the diameter reduction d of the feed screw 5 downstream from the feed opening 18 can terminate spirally in the direction of rotation. In another preferred embodiment, feed area 14 may be expanded conically onto the feed screw. In another preferred embodiment, the invention comprises a plastic melting extruder heating apparatus adapted to heat the fiber material in a transport line to the plasticizing extruder.

In yet a further embodiment of the present invention, there is a method for the production of fiber-reinforced plastic compositions using a plasticizing extruder in which cold or preheated concentrate rodlets, recyclate chips, bulk fibers or other granular materials as fiber material are drawn through a guiding gate and a preheating device into the infeed opening of the plasticizing extruder, preferably parallel to the extruder axes and approximately tangentially onto an extruder screw and wound drivingly around the extruder screws and drawn into the cylinder bores of the screw cylinders, at the same time the application of a fluid plastic film to the extruder screw lands takes place and the drawing-in/pressing-in of the fiber material into the fluid plastic film, then the fiber material is wetted or imbibed on all sides with the liquid plastic within a drawing-in and impregnation section with the individual fibers on the extruder screws and carried into a output and transport section and discharged as a fiber-reinforced plastic composition (plasticate) susceptible of further processing, characterized in that, in a first extruder, the plastic granules are melted to a preferably higher temperature than the necessary plasticate temperature, in the entrance opening of a second extruder the plasticizing extruder, the molten plastic and the fiber material are combined, and within the feed and impregnating section of the plasticizing extruder the fiber material is largely uniformly embedded in the molten plastic and brought completely to the plasticate temperature in the discharge and transport section, the fiber material being preferably preheated before combination to such an extent that it can still be fed without problems, and without sticking, into the infeed opening, and that the fiber material with the plastic fused onto it is fed into a cylinder bore of the feed screw with a wrap-around of ¼ to ¾ from the point of contact with the fiber material, which has a preferably eccentrically disposed diameter D enlarged by 2 to 20 mm.

In yet another embodiment of the present invention, there is an apparatus for the production of fiber-reinforced plastic compositions from fiber material and a melted plastic with a plasticizing extruder and a plastic melting extruder heating apparatus heating the fiber material in the transport line to the plasticizing extruder, an impregnating apparatus in the plasticizing extruder for the introduction of the fiber material and for mixing a plasticizing extruder consisting of a housing with two bores and axes of two extruder screws driven in rotation, a feed opening for the introduction of the fiber material into the bores being provided in the housing, for the practice of the methods, characterized in that, as plasticizing extruder (1), a parallel double screw extruder with preferably mop-up screw elements of great pitch is provided, which has a slot-like feed opening (18) above a feed screw (5), while, beginning from the feed opening (18) and in the range of the feed screw (5), the cylinder bore of the feed screw (5) is made with a ¼ to ¾ wrap-around (u) of diameter (D) enlarged by 2 to 20 mm, preferably eccentric, and a stripper bar (12) is disposed at the end, and thereafter the housing bore (3) of the feed screw (5) is reduced to the screw diameter (d).

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The foreign priority document, here German Patent Application No. DE 100 59 525.1, filed Nov. 30, 2000, including the specification, the drawings, the claims, and the abstract, is incorporated herein by reference in its entirety. Additionally, U.S. patent application, Ser. No. 09/997,246 (claiming priority from German Patent Application No. DE 100 59 461.1, filed Nov. 30, 2000), including the specification, the drawings, the claims and the abstract, is incorporated herein by reference in its entirety.

What is claimed is:

1. An apparatus for the production of fiber-reinforced plastic compositions from fiber material and melted plastic, comprising:

a parallel, double screw, plasticizing extruder, including
      a housing with two bores and two extruder screws driven in rotation, one of the bores being a cylinder bore having a diameter and one of the extruder screws being a feed screw,
      an impregnation section, including a slot-like feed opening provided in the housing above the feed screw for the introduction of fiber material into at least one of the bores and for mixing, wherein beginning at the feed opening the cylinder bore has a ¼ to ¾ wrap-around enlarged by 2 to 20 mm, after which the cylinder bore is reduced to the screw diameter, and
      a stripper bar disposed at the end of the wrap-around;
   and a plastic melting extruder adapted to heat the fiber material in a transport line to the plasticizing extruder.

2. The apparatus according to claim 1, wherein the ¼ to ¾ wrap-around enlarged by 2 to 20 mm is eccentric.

3. The apparatus according to claim 1, wherein the plasticizing extruder comprises mop-up screw elements.

4. The apparatus according to claim 1, wherein a feed area is expanded conically onto the feed screw.

5. The apparatus according to claim 1, wherein the enlargement is created downstream in a closed area of the plasticizing extruder.

6. The apparatus according to claim 1, wherein a driven feed roll with a stripper bar is disposed in a feed area of the feed opening.

7. The apparatus according to claim 1, wherein an entry jaw adapted to move is disposed in relation to the feed opening.

8. The apparatus according to claim 7, wherein following the entry jaw, the enlargement terminates spirally in the direction of rotation of the feed screw.

9. The apparatus according to claim 7, wherein the entry jaw is thermally insulated from the housing.

10. The apparatus according to claim 7, wherein the entry jaw is adapted to be moved by an oscillating drive.

11. The apparatus according to claim 7, wherein the entry jaw is adapted to be heated or cooled below the tackiness temperature of the fiber material.

12. The apparatus according to claim 1, wherein exchangeable scrapers are provided in the feed opening.

* * * * *